March 11, 1958 J. HIMKA 2,826,241
EASY ENTRANCE SEAT
Filed Jan. 18, 1955 5 Sheets-Sheet 3

INVENTOR
John Himka
BY
Paul Fitzpatrick
ATTORNEY

March 11, 1958 J. HIMKA 2,826,241
EASY ENTRANCE SEAT
Filed Jan. 18, 1955 5 Sheets-Sheet 4
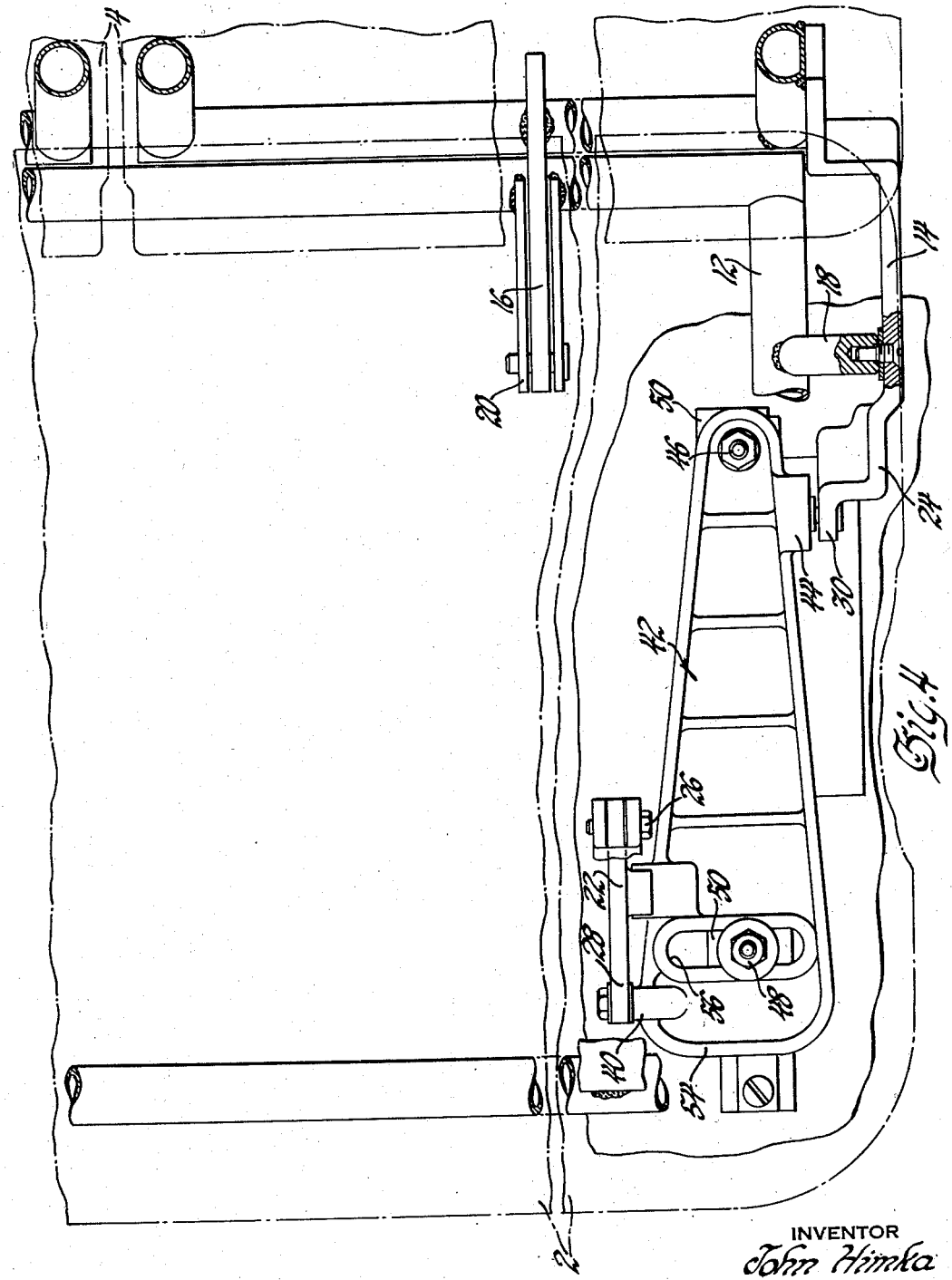

March 11, 1958  J. HIMKA  2,826,241
EASY ENTRANCE SEAT
Filed Jan. 18, 1955  5 Sheets-Sheet 5
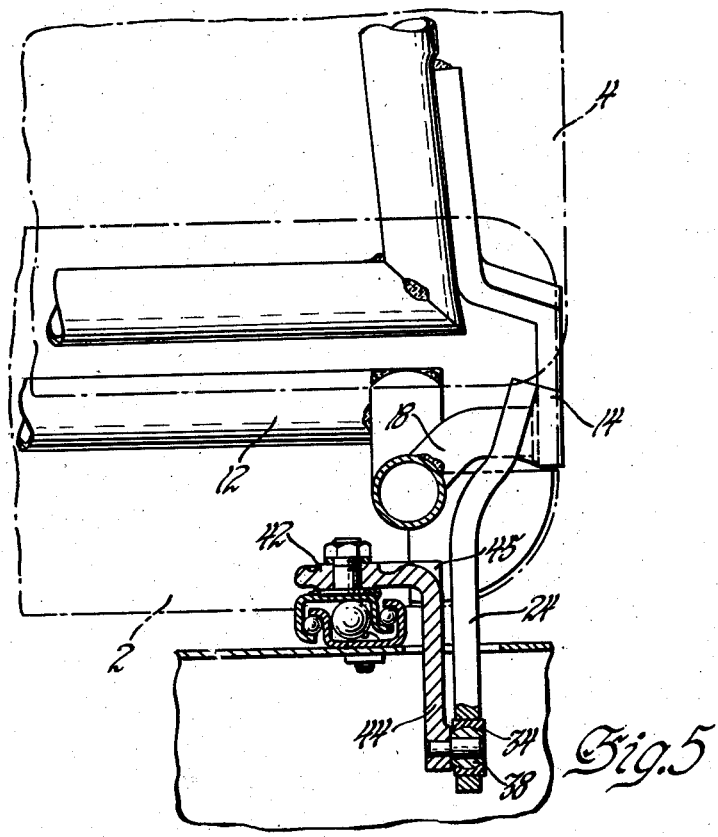
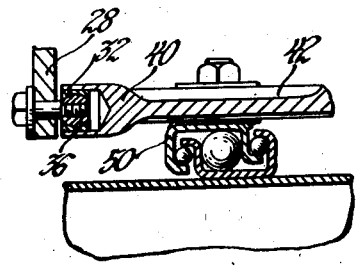
INVENTOR
John Himka
BY
Paul Fitzpatrick
ATTORNEY / 2,826,241
Patented Mar. 11, 1958

2,826,241
EASY ENTRANCE SEAT

John Himka, Detroit, Mich., assignor to General Motors Corporation, Detroit, Mich., a corporation of Delaware Application January 18, 1955, Serial No. 482,487

5 Claims. (Cl. 155—5)

This invention relates to vehicle seats and more particularly to front vehicle seats of the type wherein tilting movement of either seat back is effective to displace the entire seat forwardly to provide increased clearance for entrance to the rear vehicle seat.

An object of the present invention is to provide a front vehicle seat having a full width seat cushion structure and a pair of tiltable seat backs pivotally mounted thereon in side by side relation, wherein tilting movement of either seat back forwardly displaces the associated side of the seat cushion in a horizontal arcuate path, thereby increasing the clearance between the rear edge of the seat and the vehicle body door pillar.

Another object is to provide a structure of the stated character wherein the entire seat is connected to the vehicle body floor by parallel linkage, portions of the linkage being rigidly secured to the seat back whereby tilting movement thereof imparts swinging motion to the linkage effective to forwardly displace the seat cushion.

A further object is to provide a structure of the stated character wherein the parallel linkage includes universal joint connections accommodating dissimilar arcuate paths of motion of the seat cushion and associated seat backs, respectively.

Yet another object is to provide a seat and actuating mechanism of the type referred to which may be superimposed on conventional fore and aft seat position adjusting mechanisms and which is independently operable without affecting the preselected fixed position of adjustment of the fore and aft adjuster mechanism.

Still a further object is to provide a seat back responsive seat displacing linkage which is arranged in a manner tending to assist retention of the seat in a normal position when the seat is occupied.

These and other objects, advantages and features of the invention will appear more fully as reference is made to the accompanying specification and drawings wherein:

Fig. 4 is an enlarged fragmentary plan view of the left side of the seat looking in the direction of arrows 4—4 of Fig. 1.

Fig. 5 is a fragmentary enlarged sectional front elevational view, partly in section, looking in the direction of arrows 5—5 of Fig. 1; and Fig. 6 is an enlarged fragmentary sectional front elevational view looking in the direction of arrows 6—6 of Fig. 1.

Figure 1:
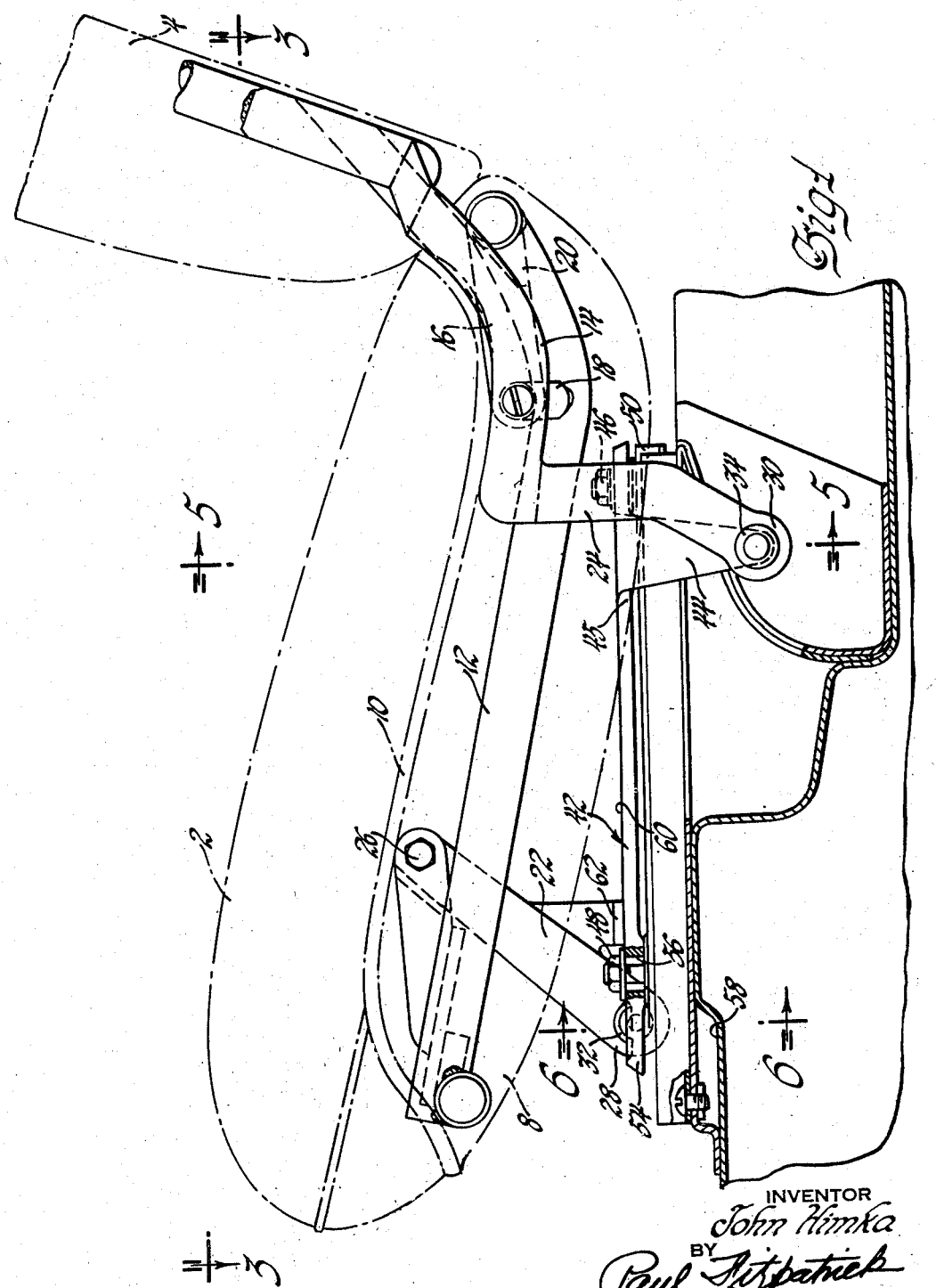
Fig. 1 is a side elevational view, partly in section, of a vehicle seat embodying the invention, illustrating the form and arrangement of the parts when the seat is in the normal occupied position, certain parts being broken away to more clearly illustrate the details of construction.
Figure 2:
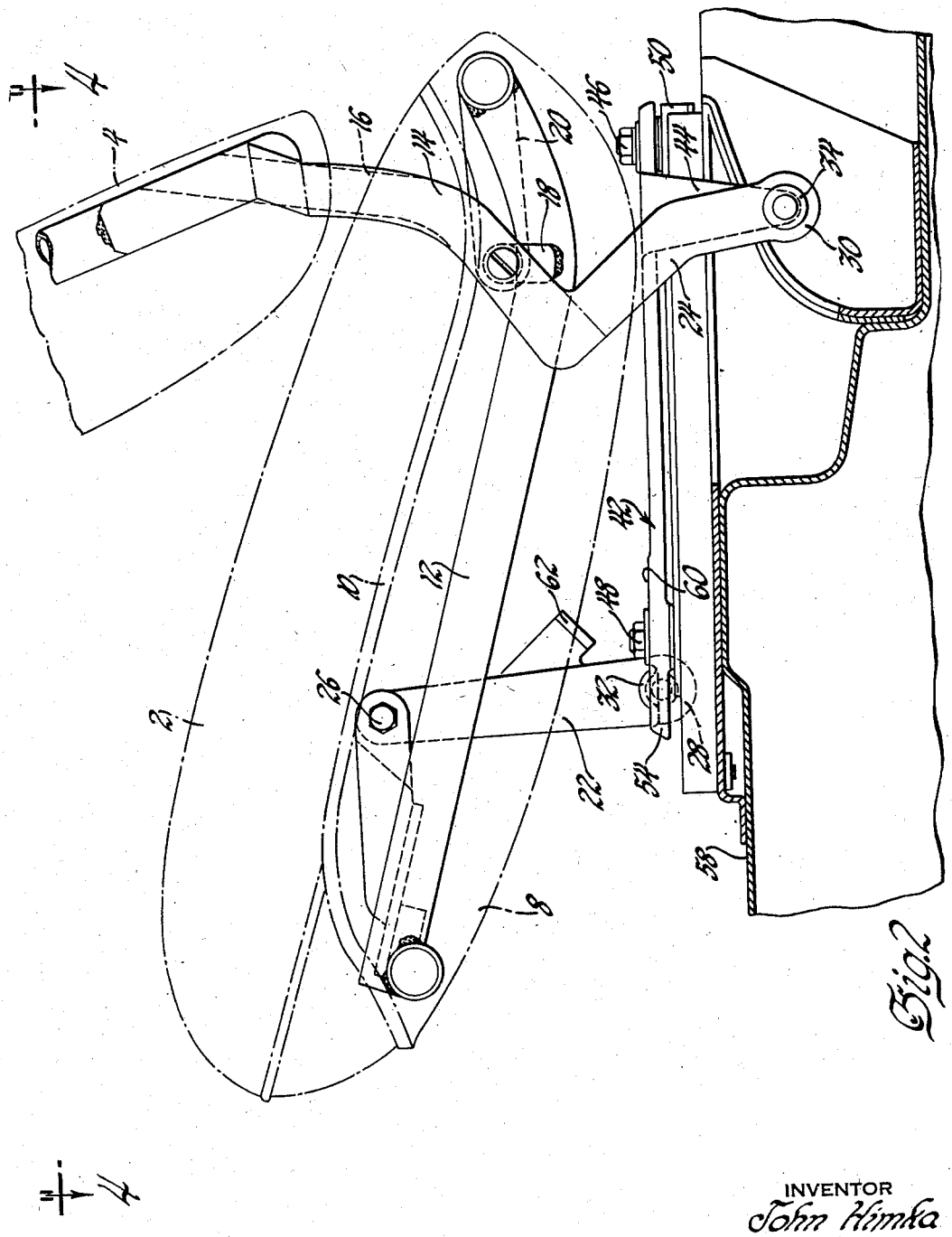
Fig. 2 is a side elevational view, partly in section, similar to Fig. 1 illustrating the relationship of the parts when the seat is in a forwardly displaced position.
Figure 3:
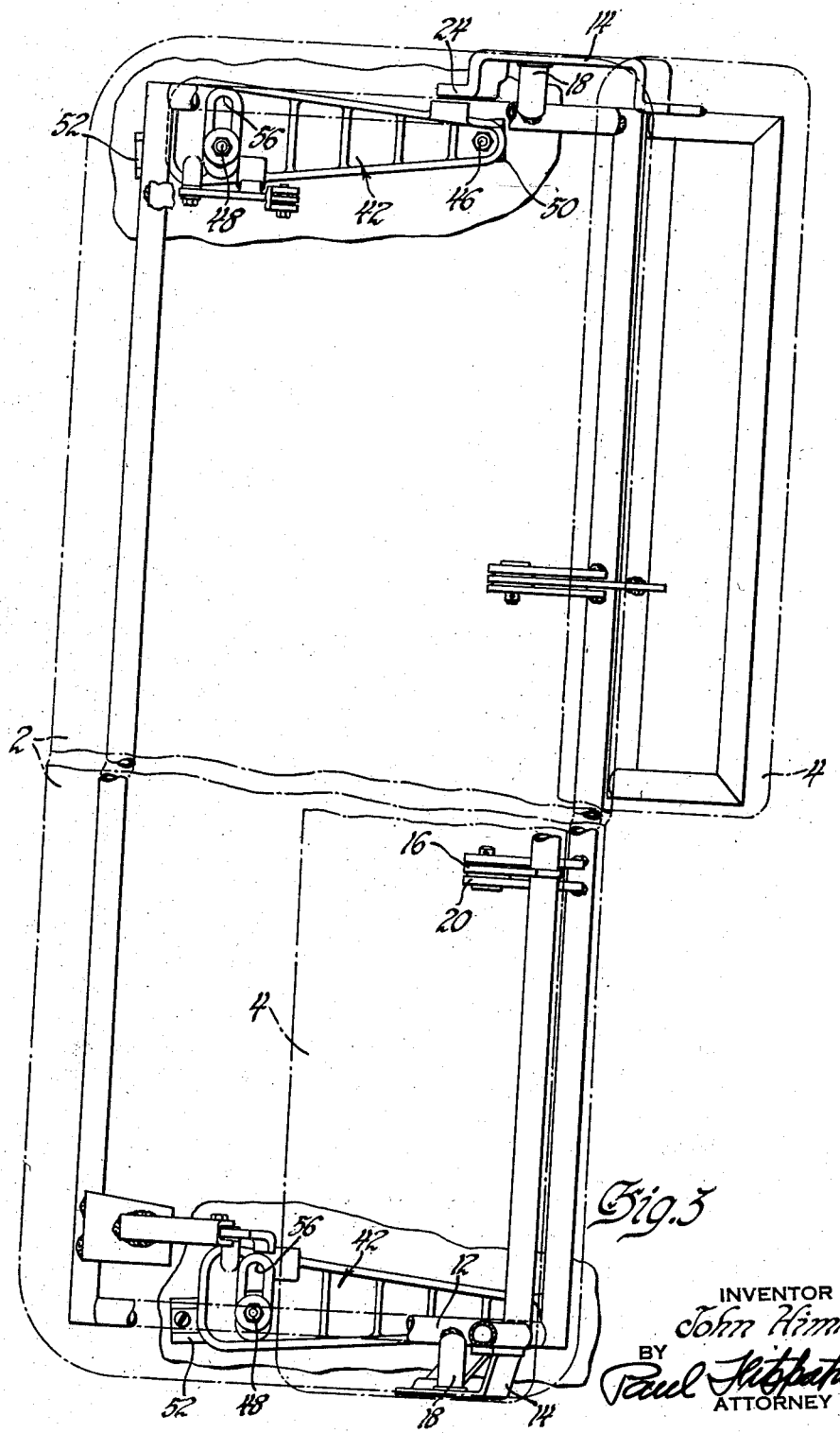
Fig. 3 is a skeletonized plan view with parts broken away, of the vehicle seat illustrated in Figs. 1 and 2, showing the relationship of the parts when one of the seat backs is forwardly displaced.

Referring now to the drawings and particularly Figs. 1 and 3, there is illustrated a vehicle front seat having a full width normally transversely extending seat cushion 2 and a pair of tiltable seat backs 4 pivotally supported in side by side relation at the rear edge of the cushion 2. Cushion 2 is mounted in a supporting frame structure 8 which extends thereunder and is provided with upturned side edges 10. Frame structure 8 is reinforced by means of a tubular skeleton 12 which forms an integral part thereof. At their lateral edges seat backs 4 are provided with spaced apart downwardly and forwardly extending arm portions 14 and 16 which are pivotally connected respectively, to spaced apart bracket members 18 and 20. Bracket members 18 and 20 are, in turn, rigidly secured in laterally spaced relation on tubular frame 12 and provided transversely aligned pivot axes for seat backs 4. Because of the transverse alignment of brackets 18 and 20, each seat back 4 is tiltable in a plane normal to the transverse axis of the seat frame 8 and cushion 2 mounted thereon. Consequently, both seat backs may be tilted forwardly simultaneously without cross-over interference.

In order to support the seat structure in the vehicle body and provide forward displacement thereof responsive to tilting of either seat back in accordance with the present invention, a pair of longitudinally spaced parallel links 22 and 24 are interposed between each side of seat frame 8 and the vehicle floor. As seen best in Fig. 1, the rear legs 24 of each pair of links constitute integral continuations of outer seat back arms 14, while the forward links 22 are pivotally connected to seat frame 8 at 26.

The lower ends 28 and 30 of forward and rearward links 22 and 24, respectively, are formed with modified socket portions 32 and 34 which are adapted for connection with ball portions 36 and 38 (Fig. 5). Ball portions 36, in turn, are rigidly connected respectively at the forward inner edges 40 of slide members 42 while ball portions 38 are rigidly secured to depending portions 44 formed integrally at the outer rearward edges 45 of members 42.

As seen best in Figs. 4 and 5, each slide member 42 is connected by bolts 46 and 48 to one of slidable, laterally spaced, adjuster rails 50. Adjuster rails 50 cooperate with fixed adjustable rails 52 to permit fore and aft adjustment of the seat to desired fixed positions in the conventional manner. Since adjuster rails 50 and 52 are conventional in construction, a detailed description thereof will be omitted. It will be understood that any known type of fore and aft seat adjuster may be utilized in connection with the present invention. As seen in Figs. 3 and 4, slide members 42 are secured to upper adjuster rails 50 in a manner permitting horizontal angular movement relative thereto about the axis of bolt connections 46. Thus, the forward ends 54 of slide members 42 may swing arcuately within the limits provided by transverse slots 56, the purpose of which will shortly become apparent.

In order that the invention may be fully understood, a description of the mode of operation will be given. As seen in Figs. 1, when both seat backs 4 are in the normal substantially vertically extending position, the downwardly extending arms 14 and legs 24 which form continuations thereof are swingable arcuately about the fixed axis defined by ball member 38. Forward links 22, in turn, are swingable arcuately about the fixed axis defined by ball member 32. Since the intermediate portion of arm 14 is also pivotally connected to the seat frame at 18, it will be seen that forward swinging movement of either seat back 4 will cause forward swinging movement of leg 24 about the axis of ball portion 38 which, in turn, will cause the pivotal connection 18 to move forwardly in an arc described from the axis of ball portion 38. Since pivotal connection 18 is integral with seat frame 8, the entire rear left side of the seat frame and cushion will rise and move forwardly in a corresponding arc. Simultaneously, the forward end of seat frame 8 and cushion 2 will rise and move forwardly in an arc defined by the link 22 about the axis of ball assembly 32.

Since each seat back 4 may be tilted forwardly independently of the other, it will be apparent that forward movement of the cushion 2 and frame 8 will be imparted at one side only, since the opposite seat back will remain vertical and thereby retain the corresponding side of seat cushion 2 and frame 8 in the rearwardly disposed position. Consequently, upon tilting of either seat back 4, the entire seat cushion 2 and frame 8 is displaced forwardly at the corresponding side in a horizontal arcuate path defined by the opposite rear pivotal connection 46 between slide member 42 and adjuster rail 50. Since fore and aft adjuster rails 50 and 52 retain their fixed parallel relation, it will be evident that both forward ends 54 of slide members 42 must be capable of horizontal swinging movement relative to the longitudinal centerline of adjuster rails 50. Thus, by providing transversely elongated slots 56 at the forward ends 54 of each slide member, as previously mentioned, the seat frame and cushion structure may swing arcuately from either rear pivotal connection 46 without imparting lateral stresses on fore and aft adjuster rails 50 and 52. It will also be seen that the plane of arcuate movement of legs 22 and 24 of the parallel links progressively change from an initial parallel relation with the transverse axis of pivotal connections 36 and 38. However, because of the provision of limited universal action between ball members 36 and 38 and socket portions 32 and 34, no interference is occasioned as a result of change in parallelism when the seat backs 4 are tilted from the full rearward to the full forward position.

It should also be noted that when the seat structure is in the normal occupied position, links 22 and 24 are directed in a rearwardly and upwardly inclined path relative to the vehicle body floor 58. By virtue of this arrangement, the total weight of the seat and the off-center rearwardly displaced relation of the seat backs combined to produce a constant positive force maintaining the entire seat structure in the normal position shown in Fig. 1. Hence considerable inertia must be overcome to displace the seat forwardly, thus preventing inadvertent actuation as from rapid deceleration of the vehicle. To provide positive rearward limits for the normal occupied position of the seat, links 22 are formed with integral stops 62 which abuttingly engage the upper surface 60 of slide rails 42 when the seat and seat backs have been actuated to the desired rearward position. It will, of course, be evident that stop 62 may be adjustable to permit limited variation in the full rearward position of the seat assembly to accommodate individual preference in seat back inclination.

From the foregoing, it will be seen that a novel and extremely simplified easy entrance seat construction has been provided. With the present invention there is available a wide range and flexibility of operation without the addition of numerous and complicated parts, yet all of the advantages of conventional seat structures heretofore available, are retained. It should be particularly noted that the present invention is completely compatible with conventional fore and aft seat adjuster mechanisms of the type used almost universally in the automotive industry. As a result the present invention may be quickly adapted for use with present day seat structures without involving extensive tooling and expense.

While but one embodiment of the invention has been shown and described, it is known that other changes and modifications may be made. It is also to be understood that it is not intended to limit the invention to the embodiment shown but only by the scope of the claims which follow.

I claim:

1. In a vehicle front seat, a cushion structure extending transversely substantially the full width of the vehicle, a pair of normally upright forwardly swingable seat backs disposed in side by side relation at the rear edge of said cushion structure, a pair of laterally spaced apart longitudinally extending seat adjuster mechanisms secured to the front of said vehicle, a horizontally swingable slide member pivotally secured to each of said adjuster mechanisms, a pair of longitudinally spaced generally vertically extending parallel links disposed between each of said slide members and the respective sides of said cushion, universal joint means pivotally connecting the lower ends of each of said pairs of links in longitudinally spaced relation on the adjacent slide member, transversely extending pivot means connecting the upper ends of each of said pairs of links at longitudinally spaced intervals at opposite sides of said cushion structure, the upper end of one of each of said pairs of links being rigidly connected to one of said seat backs whereby swingable movement of the latter causes said longitudinally spaced links to swing in corresponding arcs about the axis of their universal pivotal connections with said slide members thereby imparting forward movement to said cushion structure.

2. In a vehicle front seat, a cushion structure extending transversely the full width of the vehicle, a pair of forwardly swingable seat backs disposed in side by side relation at the rear edge of said cushion structure, a pair of laterally spaced apart longitudinally extending seat adjuster mechanisms secured to said vehicle beneath said cushion structure, a longitudinally extending horizontally swingable slide member pivotally secured to each of said adjuster mechanisms, a pair of longitudinally spaced generally vertically extending parallel links disposed between each of said slide members and the respective sides of said cushion, universal joint means pivotally connecting the lower ends of each of said pairs of links in longitudinally spaced relation on the adjacent slide member, transversely extending pivot means connecting the upper ends of each of said pairs of links at longitudinally spaced intervals on said cushion structure, the upper ends of the rearwardmost links of each of said pairs of links being rigidly connected to said back structure whereby swingable movement of the latter causes said longitudinally spaced links to swing in corresponding arcs about the axis of their pivotal connections with said slide members thereby imparting forward movement to said cushion structure.

3. In a vehicle front seat, a cushion structure extending transversely the full width of the vehicle, a pair of forwardly swingable seat backs disposed in side by side relation at the rear edge of said cushion structure, a pair of spaced apart longitudinally extending seat adjuster mechanisms secured to the floor of said vehicle, a slide member pivotally secured at its rear end to each of said adjuster mechanisms, the forward end of said slide member being horizontally arcuately slidable relative to said adjuster mechanisms, a pair of longitudinally spaced generally vertically extending parallel links disposed between each of said slide members and the respective sides of said cushion, universal joint means pivotally connecting the lower ends of each of said pairs of links in longitudinally spaced relation on the adjacent slide member, transversely extending pivot means connecting the upper ends of each of said pairs of links at longitudinally spaced intervals on said cushion structure, the upper ends of the rearwardmost links of each of said pairs of links being rigidly connected to said back structure whereby swingable movement of the latter causes said longitudinally spaced links to swing in corresponding arcs about the axis of their pivotal connections with said slide members thereby imparting forward movement to said cushion structure, the forward ends of said slide members being caused to simultaneously swing in a horizontal arc relative to said adjuster mechanisms thereby relieving lateral stress on the latter.

4. In a vehicle front seat, a cushion structure extending transversely the full width of the vehicle, a pair of forwardly swingable seat backs disposed in side by side relation at the rear edge of said cushion structure, a pair of spaced apart longitudinally extending seat adjuster mechanisms secured to the floor of said vehicle, a slide member pivotally secured at its rear end to each of said adjuster mechanisms, the forward end of said slide member being horizontally arcuately slidable relative to said adjuster mechanisms, means for limiting said arcuate slidable movement, a pair of longitudinally spaced generally vertically extending parallel links disposed between each of said slide members and the respective sides of said cushion, ball and socket means pivotally connecting the lower ends of each of said pairs of links in longitudinally spaced relation on the adjacent slide member, transversely extending pivot means connecting the upper ends of each of said pairs of links at longitudinally spaced intervals on said cushion structure, the upper ends of the rearwardmost links of each of said pairs of links being rigidly connected to said back structure whereby swingable movement of either the latter causes said associated longitudinally spaced links to swing in corresponding arcs about the axis of their pivotal connections with said slide members thereby imparting horizontal arcuate forward movement to said cushion structure, the forward ends of said slide members being caused to simultaneously swing in a horizontal arc relative to said adjuster mechanisms thereby relieving lateral stress on the latter.

5. In a vehicle front seat, a cushion structure extending transversely the full width of the vehicle, a pair of forwardly swingable seat backs disposed in side by side relation at the rear edge of said cushion structure, a pair of spaced apart longitudinally extending seat adjuster mechanisms secured to the floor of said vehicle, a slide member pivotally secured at its rear end to each of said adjuster mechanisms, the forward end of said slide member being horizontally arcuately slidable relative to said adjuster mechanisms, means for limiting said arcuate slidable movement, a pair of longitudinally spaced generally vertically extending parallel links disposed between each of said slide members and the respective sides of said cushion, ball and socket means pivotally connecting the lower ends of each of said pairs of links in longitudinally spaced relation on the adjacent slide member, transversely extending pivot means connecting the upper ends of each of said pairs of links at longitudinally spaced intervals on said cushion structure, the upper ends of the rearwardmost links of each of said pairs of links being rigidly connected to said back structure whereby swingable movement of either the latter causes said associated longitudinally spaced links to swing in corresponding arcs about the axis of their pivotal connections with said slide members thereby imparting horizontal arcuate forward movement to said cushion structure about the vertical axis of the rear pivotal connection of the opposite slide member, the forward ends of both said slide members being caused to simultaneously swing in a horizontal arc relative to said adjuster mechanisms thereby relieving lateral stress on the latter.

References Cited in the file of this patent

UNITED STATES PATENTS

| | | |
|---|---|---|
| 2,189,396 | Greig | Feb. 6, 1940 |
| 2,345,182 | Corber | Mar. 28, 1944 |
| 2,660,223 | Appleton | Nov. 24, 1953 |

FOREIGN PATENTS

| | | |
|---|---|---|
| 133,976 | Switzerland | Sept. 2, 1929 |
| 249,708 | Italy | Aug. 7, 1926 |
| 250,010 | Italy | Sept. 1, 1926 |